United States Patent [19]
Endo et al.

[11] Patent Number: 5,542,225
[45] Date of Patent: *Aug. 6, 1996

[54] ANCHORING SYSTEM FOR INSTALLING EXTERIOR MATERIALS TO A BUILDING STRUCTURE

[76] Inventors: Shozo Endo, 7-23-10 Shakujii-Dai, Tokyo, Japan; Youichi Endo, 20 Weil Pl., Cresskill, N.J.; Shuji Endo, 7-23-10 Shakujii-Dai, Tokyo, Japan

[*] Notice: The term of this patent shall not extend beyond the expiration date of Pat. No. 5,257,490.

[21] Appl. No.: 321,130

[22] Filed: Oct. 11, 1994

[51] Int. Cl.$^6$ .................................................. E04B 1/41
[52] U.S. Cl. ........................... 52/511; 52/704; 52/745.21; 52/747.12
[58] Field of Search .......................... 52/747.11, 745.21, 52/747.12, 698, 747.13, 506.05, 508, 51, 512, 704, 701, 705, 706, 707; 411/508, 509, 510, 525, 526, 527, 178, 339

[56] References Cited

U.S. PATENT DOCUMENTS

| | | |
|---|---|---|
| 3,471,183 | 10/1969 | Fischer . |
| 4,040,222 | 8/1977 | Cull . |
| 4,097,061 | 6/1978 | Deitlein . |
| 4,397,128 | 8/1983 | Wolde-Tinsae ............... 52/747.12 |
| 4,494,347 | 1/1985 | Uhlig . |
| 4,545,167 | 10/1985 | Brock . |
| 4,553,366 | 10/1985 | Guerin . |
| 4,684,286 | 8/1987 | Itagaki . |
| 4,728,236 | 3/1988 | Kraus . |
| 4,768,322 | 9/1988 | Kafarowski . |
| 4,776,143 | 10/1988 | Pointner . |
| 4,860,516 | 8/1989 | Koller et al. . |
| 4,899,513 | 2/1990 | Morris . |
| 4,984,947 | 1/1991 | Flaurand . |
| 5,257,490 | 11/1993 | Endo . |

FOREIGN PATENT DOCUMENTS

| | | |
|---|---|---|
| 1246980 | 8/1967 | Germany . |
| 2828434 | 3/1979 | Germany . |
| 598438 | 4/1978 | Switzerland . |

OTHER PUBLICATIONS

Brochure P.U.F. (date unknown).

*Primary Examiner*—Kien T. Nguyen
*Attorney, Agent, or Firm*—John P. White

[57] ABSTRACT

The present invention relates to an anchoring system and method for installing exterior material including lath and mortar to a building structure particularly suited for when the exterior materials are to be placed at a distance from the building structure. The anchoring system utilizes a separator rod having two ends wherein one end is threadingly attached to a nut joint with the other rod end extending from the nut joint. Building paper, insulation and lath may be placed on the building structure, and then a nut joint may be installed, with the other rod end being inserted into an anchoring device anchored to the building structure. The anchoring device has a speed nut which accepts the extending end of the separator rod, allowing the rod to advance into the anchoring device but which inhibits movement of the separator rod out of and away from the anchoring device in a rachet fashion.

12 Claims, 1 Drawing Sheet

5,542,225

ANCHORING SYSTEM FOR INSTALLING EXTERIOR MATERIALS TO A BUILDING STRUCTURE

BACKGROUND OF THE INVENTION

The present invention relates to an anchoring system for installing exterior materials to a building structure particularly suitable for when the exterior materials are to be spaced at a distance from the structure.

The use of insulation as a component of a building is now widely practiced to obtain better comfort and to conserve energy used for heating and cooling. However, if the insulation is placed between the structure and internal walls various problems can arise due to water condensation within the wall. There are also limitations of available wall constructions.

One solution to this problem is to place the insulation material outside the building structure. This method also gives a protection to the structure from the expansion and contraction caused by the temperature change at the various time of the year. Moreover, a building built with heavy materials such as concrete will store heat when the insulation is placed outside the structure.

Other benefits of having the exterior material cover the insulation material placed outside of a building structure include fire proofing and water proofing from the outside. Additionally, there are advantages in the weather proofing and protecting the structure from exterior impacts. Furthermore, the exterior materials would allow for a wide variety of design possibilities.

However, insulation materials are usually soft and can not hold heavy exterior materials. Also, the exterior materials placed at a distance from the structure exert great downward forces and are difficult to attach to the supporting structure. Consequently, these problems restrict the type of exterior materials that can be attached to an existing building structure, especially at distances from the structure, even though this would be ideal from the building science point of view. It also becomes difficult to attach and support exterior materials to a building structure. It is therefore important to have a connection system that is strong enough to support these exterior materials without being too difficult to attach.

One proposed system is disclosed in U.S. Pat. No. 5,257, 490 issued Nov. 2, 1993, to the present applicants, which provides an anchoring system for installing exterior materials to a building structure. The system comprises a separator rod having two ends, and a nut joint embedded in a hole in the side face of material to be attached to the structure. The nut joint has means for receiving and holding one end of the separator rod while allowing the other end of the separator rod to extend from the side face of the material to be attached to the structure. The system includes an anchoring device for mounting into a hole of the structure, the anchoring device having a receiving aperture dimensioned to receive the other end of the separator rod. The anchoring device further comprises rachet means for allowing the other end of the separator rod to advance into the receiving aperture but for inhibiting movement of the separator rod out of the receiving aperture.

While the system disclosed in this U.S. Pat. No. 5,257,490 provides a convenient way to install exterior building material having a nut joint embedded in the exterior building material, a system more particularly suited for applying lath and mortar to a building structure is desired. The present invention fulfills this need.

SUMMARY OF THE INVENTION

The present invention provides an anchoring system for installing exterior materials including lath and mortar to a building structure, comprising a separator rod having two ends, an anchoring device for mounting into a hole of the structure, the anchoring device having a receiving aperture dimensioned to receive one end of the separator rod, said anchoring device further comprising rachet means for allowing the one end of the separator rod to advance into the receiving aperture but for inhibiting movement of the separator rod out of the receiving aperture, and a nut joint adapted to be attached to the structure, said nut joint having means for receiving and holding the other end of the separator rod, said nut joint having an extending flange for supporting and holding lath to the exterior of the building and for providing means for supporting mortar after the nut joint, separator rod and anchoring device are connected to hold the lath to the exterior of the building structure.

Preferably, the separator rod has one threaded end and an undulating surface on the other end. The nut joint may have a threaded female opening and one end of the separator rod has a correspondingly sized threaded male end. The rachet means may comprise flaps extending radially inwardly in the receiving aperture, and wherein the separator rod has an undulating surface on its other end for engagement with the flaps.

According to another aspect of the invention, a system for installing exterior materials including lath and mortar to a building structure is provided, comprising an anchoring device for mounting into a hole in the structure, the anchoring device having a receiving aperture, an enlarged end portion having a recess larger than the receiving aperture and having a threaded male exterior, a nut ring to be received within the end portion recess, the nut ring having flaps extending more radially inwardly than the diameter of the anchoring device receiving aperture, a cap having means for coupling with the anchoring device for holding the nut ring within the recess, and having an aperture to align with the fastening device aperture, a separator rod having a first threaded end portion and a second undulating surfaced end portion for being received and held by the nut ring flaps when received in the anchoring device receiving aperture; and a nut joint adapted to be attached to the structure, the nut joint having an internally threaded receiving aperture for threaded engagement with the first threaded end portion of the separator rod, the nut joint having an extending flange for supporting and holding lath to the exterior of the building and for providing means for supporting mortar after the nut joint, separator rod and anchoring device are connected to hold the lath to the exterior of building structure.

The present invention also provides a method for installing exterior materials including lath and mortar to the exterior surface of a building structure, comprising mounting an anchoring device into a hole in the structure, the anchoring device having a receiving aperture dimensioned to receive and hold an end of a two ended separator rod; performing the following steps, not necessarily in the following order: mounting one end of the separator rod to a nut joint having internal engagement means to hold and engage one end of the separator rod, applying lath to the exterior surface of the building structure, and inserting the other end of the separator rod into the anchoring device receiving aperture to hold the separator rod; and applying mortar to the lath and nut joint.

DETAILED DESCRIPTION OF THE PREFERRED EMBODIMENT

Figure 1:
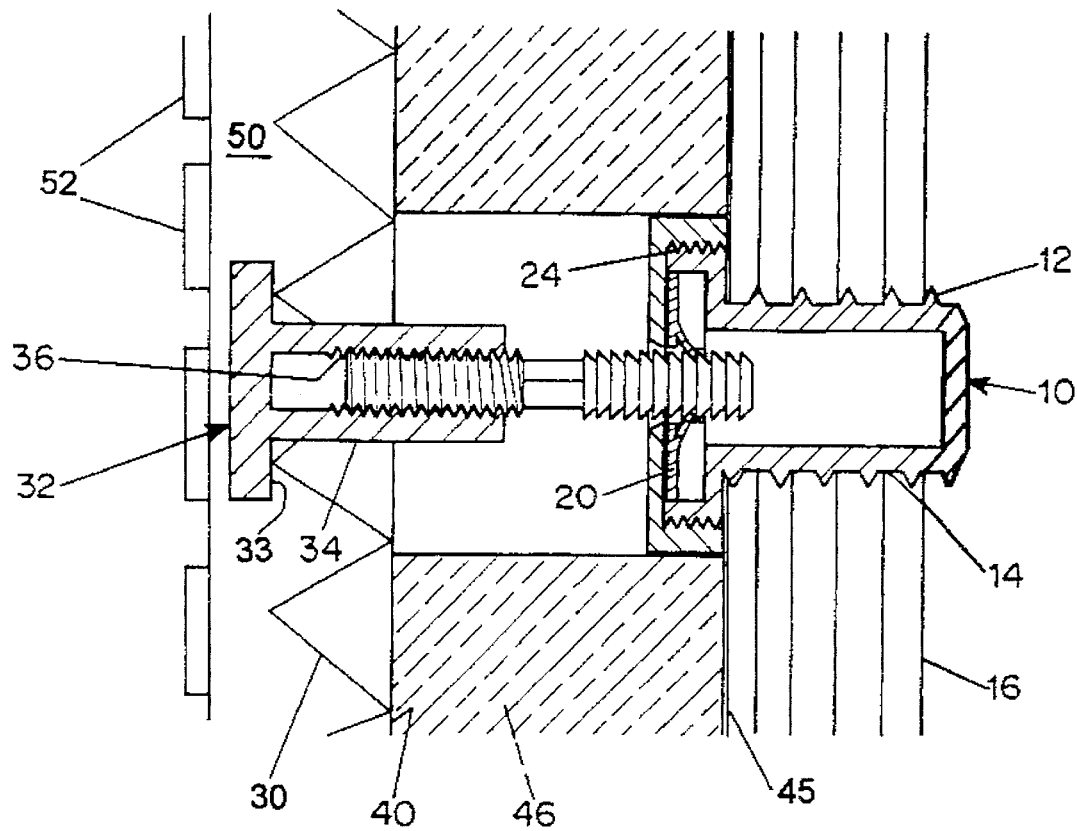
FIG. 1 is an elevational view, in cross-section of an embodiment of an anchoring system for installing exterior materials to a building structure according to the present invention.

The present invention provides an anchoring system for installing exterior materials including lath and mortar to a building structure, comprising a separator rod having two ends, an anchoring device for mounting into a hole of the structure, the anchoring device having a receiving aperture dimensioned to receive one end of the separator rod, said anchoring device further comprising rachet means for allowing the one end of the separator rod to advance into the receiving aperture but for inhibiting movement of the separator rod out of the receiving aperture, and a nut joint adapted to be attached to the structure, said nut joint having means for receiving and holding the other end of the separator rod, said nut joint having an extending flange for supporting and holding lath to the exterior of the building and for providing means for supporting mortar after the nut join, separator rod and anchoring device are connected to hold the lath to the exterior of the building structure.

Preferably, the separator rod has one threaded end and an undulating surface on the other end. The nut joint may have a threaded female opening and one end of the separator rod has a correspondingly sized threaded male end. The rachet means may comprise flaps extending radially inwardly in the receiving aperture, and wherein the separator rod has an undulating surface on its other end for engagement with the flaps.

The anchoring device preferably comprises a fastening device having an exterior threaded surface for mounting in a hole of the structure. The anchoring system may further comprise an enlarged end portion, the speed nut having radially inwardly extending flaps, and means for retaining the speed nut in the enlarged end portion.

The means for retaining may comprise an exterior male thread on the enlarged end portion and a screw cap having an internally threaded female thread to mate with the thread on the enlarged end portion. The screw cap may have at least one flattened edge surface for aiding in threadingly engaging the screw cap to the enlarged end portion. The screw cap may have six flattened edge surfaces arranged to form a hexagon.

According to another aspect of the invention, a system for installing exterior materials including lath and mortar to a building structure is provided, comprising an anchoring device for mounting into a hole in the structure, the anchoring device having a receiving aperture, an enlarged end portion having a recess larger than the receiving aperture and having a threaded male exterior, a nut ring to be received within the end portion recess, the nut ring having flaps extending more radially inwardly than the diameter of the anchoring device receiving aperture, a cap having means for coupling with the anchoring device for holding the nut ring within the recess, and having an aperture to align with the fastening device aperture, a separator rod having a first threaded end portion and a second undulating surfaced end portion for being received and held by the nut ring flaps when received in the anchoring device receiving aperture; and nut joint adapted to be attached to the structure, the nut joint having an internally threaded receiving aperture for threaded engagement with the first threaded end portion of the separator rod, the nut having an extending flange for supporting and holding lath to the exterior of the building and for providing means for supporting mortar after the nut joint, separator rod and anchoring device are connected to hold the lath to the exterior of building structure.

According to another aspect of the invention, a method for installing exterior materials including lath and mortar to a building structure is provided, comprising mounting an anchoring device into a hole in the structure, the anchoring device having a receiving aperture dimensioned to receive and hold an end of a two ended separator rod; performing the following steps, not necessarily in the following order: mounting one end of the separator rod to a nut joint having internal engagement means to hold and engage one end of the separator rod, applying lath to the exterior surface of the building structure, and inserting the other end of the separator rod into the anchoring device receiving aperture so that the flaps engage and hold the separator rod; and applying mortar to the lath and nut joint.

The present invention described herein is used to securely attach exterior materials such as building paper, insulation, lath, mortar, and exterior stone to a building structure. The ability to accomplish this has become increasingly important in view of recent construction trends in using decorative exterior materials and in having insulation outside the building structure.

Figure 2:
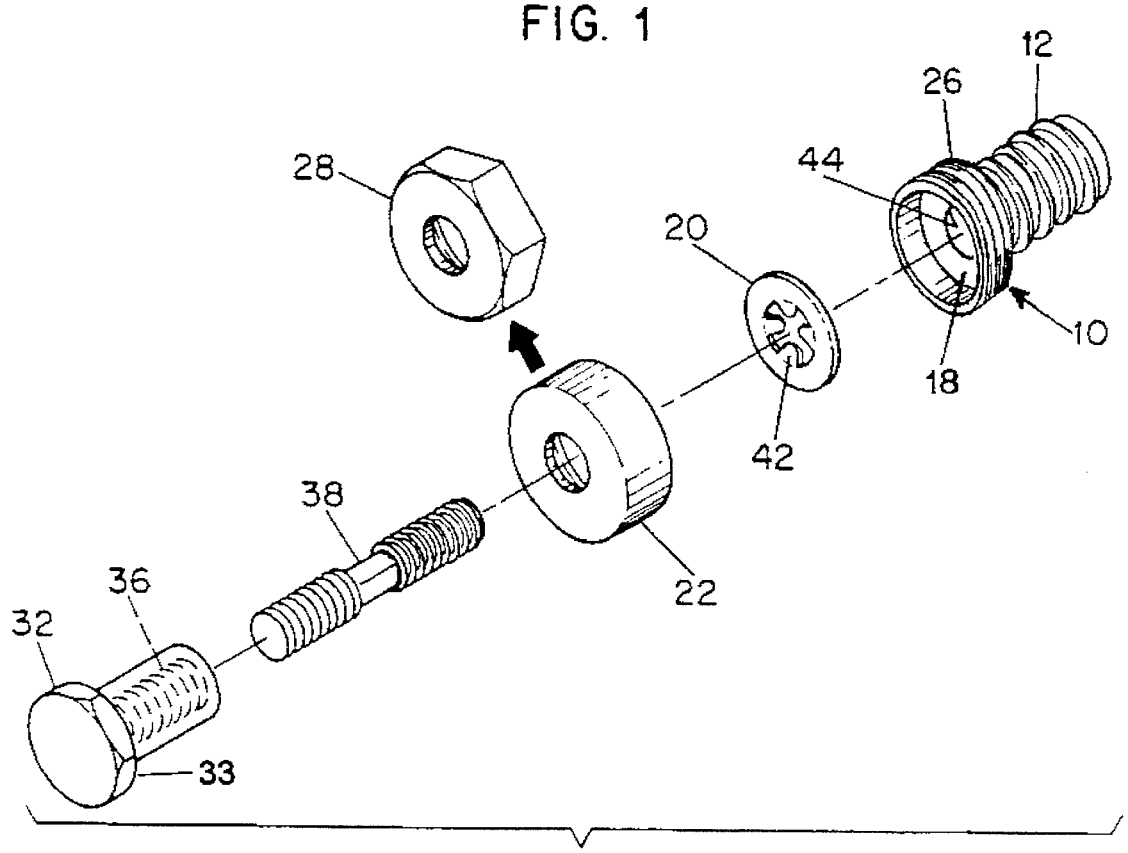
FIG. 2 is an exploded view of an embodiment of the anchoring system for installing exterior materials to a building structure according to the present invention.

In the preferred embodiment of the present invention as shown in FIGS. 1 and 2, an anchoring device 10 having external thread 12 is adapted to be screwed into a hole 14 of a building structure 16. The anchoring device also includes a recessed portion 18 which contains and holds a speed nut mechanism 20 that is held in place by a screw cap 22. The screw cap 22 has internal threads 24 which threadingly engage external threads 26 on anchoring device 10. The screw cap 22 may be round as shown in the bottom of FIG. 2, or may have one or more flattened edge surfaces 28 (in this case 6) as shown in the top of FIG. 2 to aid in engaging and tightening the screw cap 22 to the anchoring device 10.

After the anchoring device is mounted in the hole of the building structure, building paper 45 and insulation 46 may be placed on the outside of the building structure. Exterior lath 30 may then be placed over the insulation 46.

A nut joint 32 has an internally threaded receiving aperture 36. A separator rod 38 has two ends, one end of which is screwed into the threaded aperture 36 of the nut joint 32, the other extending end of which may be placed into the speed nut mechanism 20. The speed nut mechanism has a ratchet means in the form of radially inwardly extending flaps 42. The speed nut mechanism ratchet arrangement allows the extending end of the separator rod to advance into the receiving aperture 44 in the anchoring device 10, but inhibits outward movement of the separator rod 38. The lath 30 is thus held in place with the insulation 46 by the extending flange 33 of nut joint 32. Mortar 50 may then be applied to the lath 30, and exterior surface stone 52 may be applied to the mortar surface.

While one embodiment of the invention has been shown and described, numerous variations and modifications will readily occur to those skilled in the art. The invention is thus not limited to the particular embodiment illustrated, and its scope should be determined only by way of the following claims.

What is claimed is:

1. An anchoring system for installing exterior material including lath and mortar to a building structure, said structure having a hole defined therein for mounting the material, comprising:

a separator rod having two ends;

an anchoring device for mounting into the hole of the structure, said anchoring device having a receiving aperture dimensioned to receive one end of the separator rod, said anchoring device further comprising ratchet means for allowing one end of the separator rod to advance into the receiving aperture and for inhibiting movement of the separator rod out of the receiving aperture; and a nut joint adapted to be attached to the material to be attached to the structure, said nut joint having means for receiving and holding the other end of the separator rod, said nut joint having an extending flange for supporting and holding lath to the exterior of the building and for providing means for supporting mortar after said nut joint, said separator rod and said anchoring device are connected to hold the lath to the exterior of the building structure.

2. The anchoring system according to claim 1, wherein the one end of the separator rod is threaded and the other end has an undulating surface.

3. The anchoring system according to claim 1, wherein the nut joint has a threaded female opening and wherein the one end of the separator rod has a correspondingly sized threaded male end.

4. The anchoring system according to claim 1, wherein the ratchet means comprises flaps extending radially inwardly in the receiving aperture, and wherein the separator rod has an undulating surface on its other end for engagement with the flaps.

5. The anchoring system according to claim 1, wherein the anchoring device comprises a fastening device having an exterior threaded surface for mounting in the hole of the structure.

6. An anchoring system according to claim 5, wherein the anchoring device comprises:

an enlarged end portion;

a speed nut received in said enlarged end portion, said speed nut having radially inwardly extending flaps; and means for retaining the speed nut in the enlarged end portion.

7. The anchoring system according to claim 6, wherein the means for retaining comprises an exterior male thread on the enlarged end portion and a screw cap having an internally threaded female thread to mate with the thread on the enlarged end portion.

8. The anchoring system according to claim 7, wherein the screw cap has at least one flattened edge surface for aiding in threadingly engaging the screw cap to the enlarged end portion.

9. The anchoring system according to claim 8, wherein the screw cap has six flattened edge surfaces arranged to form a hexagon.

10. A system for installing exterior material including lath and mortar to a building structure, said structure having a hole defined therein for mounting the material, comprising:

an anchoring device for mounting into the hole in the structure, said anchoring device having a receiving aperture, an enlarged end portion having a recess larger than the receiving aperture and having a threaded male exterior;

a nut ring to be received within the end portion recess, said nut ring having flaps extending more radially inwardly than the diameter of the anchoring device receiving aperture;

a cap having means for coupling with the anchoring device for holding the nut ring within the recess, and having an aperture to align with the fastening device aperture;

a separator rod having a first threaded end portion, and a second undulating surfaced end portion for being received and held by the nut ring flaps when received in the anchoring device receiving aperture; and a nut joint adapted to be attached to the material to be attached to the structure, said nut joint having an internally threaded receiving aperture for threaded engagement with the first threaded end portion of the separator rod, said nut joint having an extending flange for supporting and holding lath to the exterior of the building and for providing means for supporting mortar after said nut joint, said separator rod and said anchoring device are connected to hold the lath to the exterior of the building structure.

11. A method for installing exterior material including lath and mortar to the exterior surface of a building structure, said structure having a hole defined therein for mounting the material, comprising:

mounting an anchoring device into the hole in the structure, said anchoring device having a receiving aperture dimensioned to receive and hold an end of a two ended separator rod;

performing the following steps, not necessarily in the following order: mounting one end of the separator rod to a nut joint having internal engagement means to hold and engage one end of the separator rod, applying lath to the exterior surface of the building structure, and inserting the other end of the separator rod into the anchoring device receiving aperture to hold the separator rod; and applying mortar to the lath and nut joint.

12. The method according to claim 11, further including the step of applying stone to the mortar.

* * * * *